P. G. LARSSON.
PUMPING DEVICE FOR VELOCIPEDES.
APPLICATION FILED FEB. 1, 1909.
928,919.
Patented July 20, 1909.
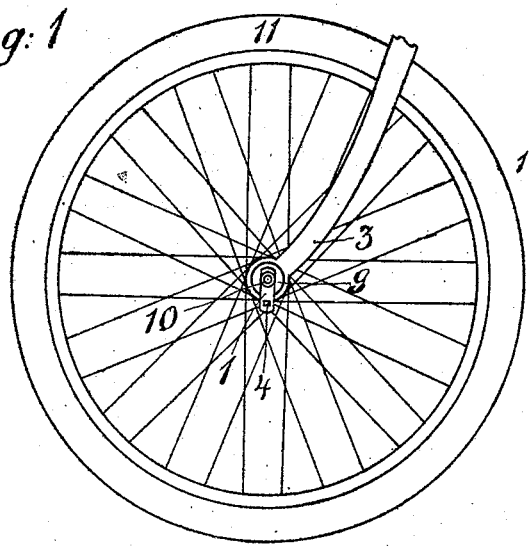
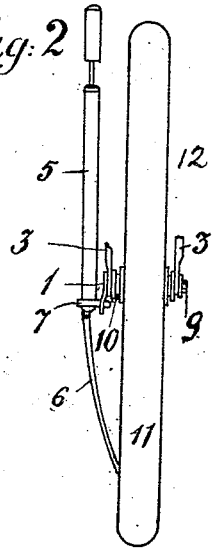
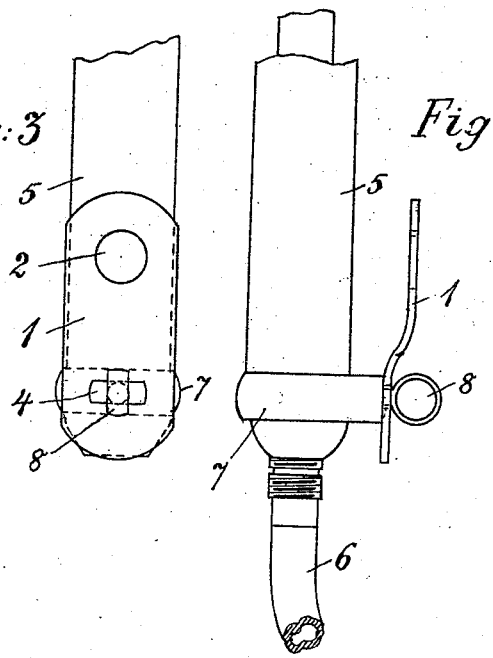
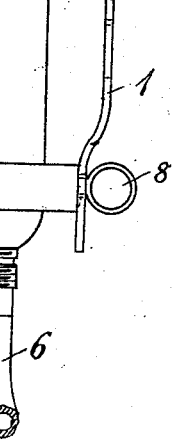
Witnesses:
T. L. Mockabee
C. J. Babcock
Inventor
Per G. Larsson
by Wm. H. Babcock
Attorney

UNITED STATES PATENT OFFICE.

PER GOTTHARD LARSSON, OF KRISTIANSTAD, SWEDEN.

PUMPING DEVICE FOR VELOCIPEDES.

No. 928,919.           Specification of Letters Patent.           Patented July 20, 1909.

Application filed February 1, 1909. Serial No. 475,444.

*To all whom it may concern:*

Be it known that I, PER GOTTHARD LARSSON, a subject of the King of Sweden, residing at and whose post-office address is Kristianstad, Sweden, have invented certain new and useful Improvements in Pumping Devices for Velocipedes; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to means for attaching tire-inflating pumps to the axles of vehicle wheels and the object of such invention is to provide for holding the pump by such means, in operative position while pumping, without requiring the use of more than one hand or foot in that operation.

To this end the said invention consists in the construction and combination of parts hereinafter more specifically set forth and claimed.

In the accompanying drawings Figure 1 represents a side elevation of a bicycle wheel, to which a plate partly embodying my invention is attached; Fig. 2, a view in front elevation of the same with an air pump attached; Fig. 3 a detail elevation on a larger scale of the attaching plate and the lower part of the pump looking away from the wheel and Fig. 4 represents on a similar scale a view in detail elevation of these parts at right angles to Fig. 3, showing more fully the ring and button hereinafter described and also showing the rubber tube attached to said pump.

1 designates the plate which is one of the elements used to attach the air pump 5 to the wheel 12, having the usual pneumatic tire 11 and axle 10, also the valve for said tire from which a rubber tube extends to the pump 5. The fork 3 of the bicycle frame is supported on said axle. The parts thus far described have the usual construction and arrangement.

The upper end of the plate 1 is provided with a hole 2, adapted to fit on the end of the axle protruding beyond said plate, which end receives a nut 9, screwed on the same, and the lower part of said plate is bent outward and again downward so as to be nearly in the vertical plane with the face of said nut and the end of the shaft and leave room for the button hereinafter described without requiring too great an extension of the latter toward the wheel, while leaving room for said nut between the plate 1 and pump 5 and preventing any part from getting in the way of the other. The lower part of said plate is provided with an opening 4, which is preferably elongated horizontally and has rectangular corners. 7 designates a ring clamped around the lower part of said pump and provided with a projecting button 8 presented rigidly toward the wheel. This button has a narrow neck or stem and an enlarged head, the said stem being of such size that it may turn in said opening, but the said head and opening of such relative size and form that the said head may pass through said opening when said pump is in one position but will be turned across the material of said plate proximate to said slot when said pump is turned into another position, so that said button cannot then be withdrawn through said plate to free said pump from said plate and wheel. The said head as shown has a narrow disk-form presented with its periphery toward the wheel: but the form of the button and that of the slot may obviously be considerably varied, provided the relations stated be maintained.

To apply the pump, it is held in horizontal position, while the head of button 8 is passed through slot 4 of plate 1, and the said pump is then turned upright into the position shown in Figs. 2 and 4, bringing the said button head across the said slot or opening 4 as clearly shown in Fig. 3. While in the latter position the operator will need to use only one hand or foot for steadying it while pumping.

Having thus described my invention, what I claim as new and desire to secure by Letters Patent is:

1. In combination, a vehicle wheel having a pneumatic tire and axle, a plate attached to said axle and having an opening and an air pump and a button attached to said air pump and adapted to pass through said opening, the said button and opening having such shape that the button head may pass through and be turned across the material of the plate substantially as set forth.

2. In combination with a pump and a vehicle wheel having an axle, a button attached to said pump and a plate attached to the axle of said wheel and having an elongated opening, the head of said button adapted to be passed through said opening and turned across the same substantially as set forth.

3. A pump, a ring fastened on said pump and a button projecting from said ring, in combination with a vehicle wheel having a pneumatic tire and axle and a plate attached to said axle and having an opening, the head of said button being adapted to pass through said opening and turn with said pump into position for said head to overlap the said plate substantially as set forth.

4. A plate having a hole at its upper end and a slot at its lower in combination with a wheel axle adapted to pass into said hole, a nut on said axle adapted to fasten said plate thereto, a pump, a ring fastened on said pump and a button on said ring adapted to pass through the said opening when the pump is horizontal but to turn across said slot and engage said plate when the pump is turned upright.

5. In combination, a vehicle wheel an axle therefor, nuts for said axle, a plate having a hole near its upper end, a slot near its lower end, and an outwardly turned angle and being fastened to said axle by said hole in its upper end, and an air pump provided on its lower end with a band having a projection adapted to engage the slot in the lower end of said plate.

6. In combination, a vehicle wheel an axle therefor, a plate having a slot, means for fastening said plate at its upper end to said axle, an air pump and a button fastened to the lower end thereof and adapted to engage the slot in said plate substantially as set forth.

In testimony, that I claim the foregoing as my invention, I have signed my name in presence of two subscribing witnesses.

PER GOTTHARD LARSSON.

Witnesses:
E. RÅBERG,
N. WRANZELL.